United States Patent
Hutz et al.

(10) Patent No.: US 11,200,793 B2
(45) Date of Patent: Dec. 14, 2021

(54) NOTIFICATIONS FOR CAMERA TAMPERING

(71) Applicant: Alarm.com Incorporated, Tysons, VA (US)

(72) Inventors: David James Hutz, Herndon, VA (US); Allison Beach, Leesburg, VA (US); Weihong Yin, Great Falls, VA (US); Donald Gerard Madden, Columbia, MD (US); Adam Gordon, Tysons, VA (US); Benjamin Asher Berg, Washington, DC (US); Christopher Silverman, Alexandria, VA (US); Donald Faraci, Falls Church, VA (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 16/928,122

(22) Filed: Jul. 14, 2020

(65) Prior Publication Data

US 2021/0020022 A1   Jan. 21, 2021

Related U.S. Application Data

(60) Provisional application No. 62/874,071, filed on Jul. 15, 2019.

(51) Int. Cl.
| | |
|---|---|
| *G06K 9/00* | (2006.01) |
| *G08B 29/04* | (2006.01) |
| *G08B 13/196* | (2006.01) |
| *G08B 25/00* | (2006.01) |

(52) U.S. Cl.
CPC ....... *G08B 29/046* (2013.01); *G06K 9/00295* (2013.01); *G06K 9/00335* (2013.01); *G06K 9/00711* (2013.01); *G06K 9/00771* (2013.01); *G08B 13/19602* (2013.01); *G08B 25/008* (2013.01)

(58) Field of Classification Search
CPC .......... G06K 9/00771; G06K 9/00711; G06K 9/00335; G08B 29/02; G08B 13/19602
See application file for complete search history.

(56) References Cited

U.S. PATENT DOCUMENTS

| | | | |
|---|---|---|---|
| 9,230,176 B2 | 1/2016 | Choi et al. | |
| 10,185,628 B1* | 1/2019 | Snyder | ............... G06F 11/1451 |
| 2007/0247526 A1 | 10/2007 | Flook et al. | |

(Continued)

OTHER PUBLICATIONS

PCT International Search Report and Written Opinion in International Application No. PCT/US2020/041983, dated Oct. 13, 2020, 7 pages.

*Primary Examiner* — Benyam Haile
(74) *Attorney, Agent, or Firm* — Fish & Richardson P.C.

(57) ABSTRACT

Methods, systems, and apparatus, including computer programs encoded on a storage device, are disclosed. A system includes one or more processors and one or more computer storage media storing instructions that are operable, when executed by the one or more processors, to cause the one or more processors to perform operations comprising: obtaining, by the system, video of a scene captured by a camera; determining a likelihood that the camera will be tampered with based on the video of the scene; determining that the likelihood that the camera will be tampered with satisfies criteria; and transmitting data generated from the video.

19 Claims, 3 Drawing Sheets

(56) References Cited

U.S. PATENT DOCUMENTS

| | | |
|---|---|---|
| 2012/0274776 A1 | 11/2012 | Gupta et al. |
| 2016/0286156 A1 | 9/2016 | Kovac |
| 2017/0344858 A1* | 11/2017 | Ohira .................. G06K 9/00771 |
| 2018/0247504 A1 | 8/2018 | Siminoff et al. |
| 2019/0088108 A1 | 3/2019 | Mandadi et al. |
| 2019/0158789 A1 | 5/2019 | Snyder et al. |
| 2019/0236342 A1* | 8/2019 | Madden ............. G06K 9/00228 |

\* cited by examiner

NOTIFICATIONS FOR CAMERA TAMPERING

CROSS-REFERENCE TO RELATED APPLICATION

This application claims the benefit of U.S. Application No. 62/874,071, filed Jul. 15, 2019, which is incorporated by reference in its entirety.

TECHNICAL FIELD

This disclosure application relates generally to security cameras.

BACKGROUND

Many properties are equipped with monitoring systems that include sensors and connected system components. Some monitoring systems include security cameras that may be configured to detect events and then take action in response to the detection of the events.

SUMMARY

Techniques are described for notifications for camera tampering.

Many residents and homeowners equip their properties with monitoring systems to enhance the security, safety, or convenience of their properties. The property monitoring systems can include security cameras, which can obtain visual images of scenes at the property. Security cameras can be effective deterrents to crime, but they are also subject to tampering. Adversaries may move, occlude, damage, destroy, disconnect, or steal a security camera to prevent capture and review of footage.

Since a security camera may be compromised post-tampering, it may be desirable for a monitoring system to be proactive about identifying possible instances of tampering, capturing any related evidence, and sending this data off-camera before tampering makes this impossible. For example, were an intruder to approach a camera and smash the camera before the camera is able to upload video of the intruder, then information that may identify the intruder may be lost when the camera is destroyed. Accordingly, in one example, a security camera may determine that it is likely to be tampered with as a stranger is directly approaching the camera and, in response, immediately upload an image of the stranger's face so that the stranger may be still be later identified if the security camera is destroyed by the stranger.

According to an innovative aspect of the subject matter described in this specification, a system includes one or more processors and one or more computer storage media storing instructions that are operable, when executed by the one or more processors, to cause the one or more processors to perform operations including: obtaining, by the system, video of a scene captured by a camera; determining a likelihood that the camera will be tampered with based on the video of the scene; determining that the likelihood that the camera will be tampered with satisfies criteria; and transmitting data generated from the video.

In some implementations, determining the likelihood that the camera will be tampered with based on the video of the scene includes determining, using video analysis, that a person depicted within the scene is approaching the camera.

In some implementations, determining that the person depicted within the scene is approaching the camera includes determining one or more of a speed of approach, a direction of approach, a distance from the camera, a movement of a limb, or an eye direction of the person.

In some implementations, determining the likelihood that the camera will be tampered with based on the video of the scene includes determining, using video analysis, that a person depicted within the scene is an unrecognized person.

In some implementations, determining that the person depicted within the scene is an unrecognized person includes determining that at least part of the person's face is concealed.

In some implementations, the operations include: in response to determining that the likelihood that the camera will be tampered with satisfies a criteria, estimating, using video analysis, a time that camera tampering will likely occur.

In some implementations, transmitting the data generated from the video includes determining, based on the estimated time that the camera will be tampered with, a size of data that is capable of transmission before the estimated time that the camera will be tampered with; and based on determining the size of data that is capable of transmission before the estimated time that the camera will be tampered with, selecting a subset of data to transmit, the subset of data having a size that is less than the size of data that is capable of transmission before the estimated time.

In some implementations, determining that the likelihood that the camera will be tampered with satisfies criteria includes: determining a risk score of camera tampering; determining that the risk score exceeds a threshold risk score; and based on determining that the risk score exceeds the threshold risk score, determining that the likelihood that the camera will be tampered with satisfies the criteria.

In some implementations, transmitting the data generated from the video includes transmitting, to a server and from the system, a notification of likely camera tampering.

In some implementations, transmitting the data generated from the video includes transmitting, in real-time, the data generated from the video.

In some implementations, the operations include: determining (i) that the camera was not tampered with or (ii) that the likelihood that the camera will be tampered with no longer satisfies criteria; and in response to determining (i) that the camera was not tampered with or (ii) that the likelihood that the camera will be tampered with no longer satisfies the criteria: transmitting a notification that (i) that the camera was not tampered with or (ii) that the likelihood that the camera will be tampered with no longer satisfies the criteria; and transmitting video data that was stored prior to determining that the likelihood that the camera will be tampered with satisfied the criteria.

In some implementations, the operations include: receiving, by the system, system data indicating a status of one or more system components; and determining the likelihood that the camera will be tampered with based on the video of the scene and based on the status of the one or more system components.

In some implementations, the status of the one or more system components includes an arming status of a monitoring system that is configured to monitor a location of the scene.

In some implementations, the status of the one or more system components includes a status of one or more additional cameras. Determining the likelihood that the camera will be tampered with based on the video of the scene and based on the status of the one or more system components may include: determining, based on the status of the one or more additional cameras, that the one or more additional cameras was tampered with; and based on determining that the one or more additional cameras was tampered with, determining the likelihood that the camera will be tampered with.

In some implementations, the operations include: in response to transmitting the data generated from the video, receiving a confirmation that the camera was tampered with; and in response to receiving the confirmation that the camera was tampered with, performing a system action.

In some implementations, the operations include: after determining that the likelihood that the camera will be tampered with satisfies criteria; analyzing a functional state of the camera; based on analyzing the functional state of the camera, determining that the camera was tampered with; and in response to determining that the camera was tampered with, performing a system action.

In some implementations, the operations include: after determining that the likelihood that the camera will be tampered with satisfies criteria, analyzing a functional state of the camera; based on analyzing the functional state of the camera, determining that the camera was not tampered with; and in response to determining that the camera was not tampered with, transmitting a notification that the camera was not tampered with.

In some implementations, determining the likelihood that the camera will be tampered with includes determining a likelihood that the camera will be moved, occluded, damaged, destroyed, disconnected, or stolen.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
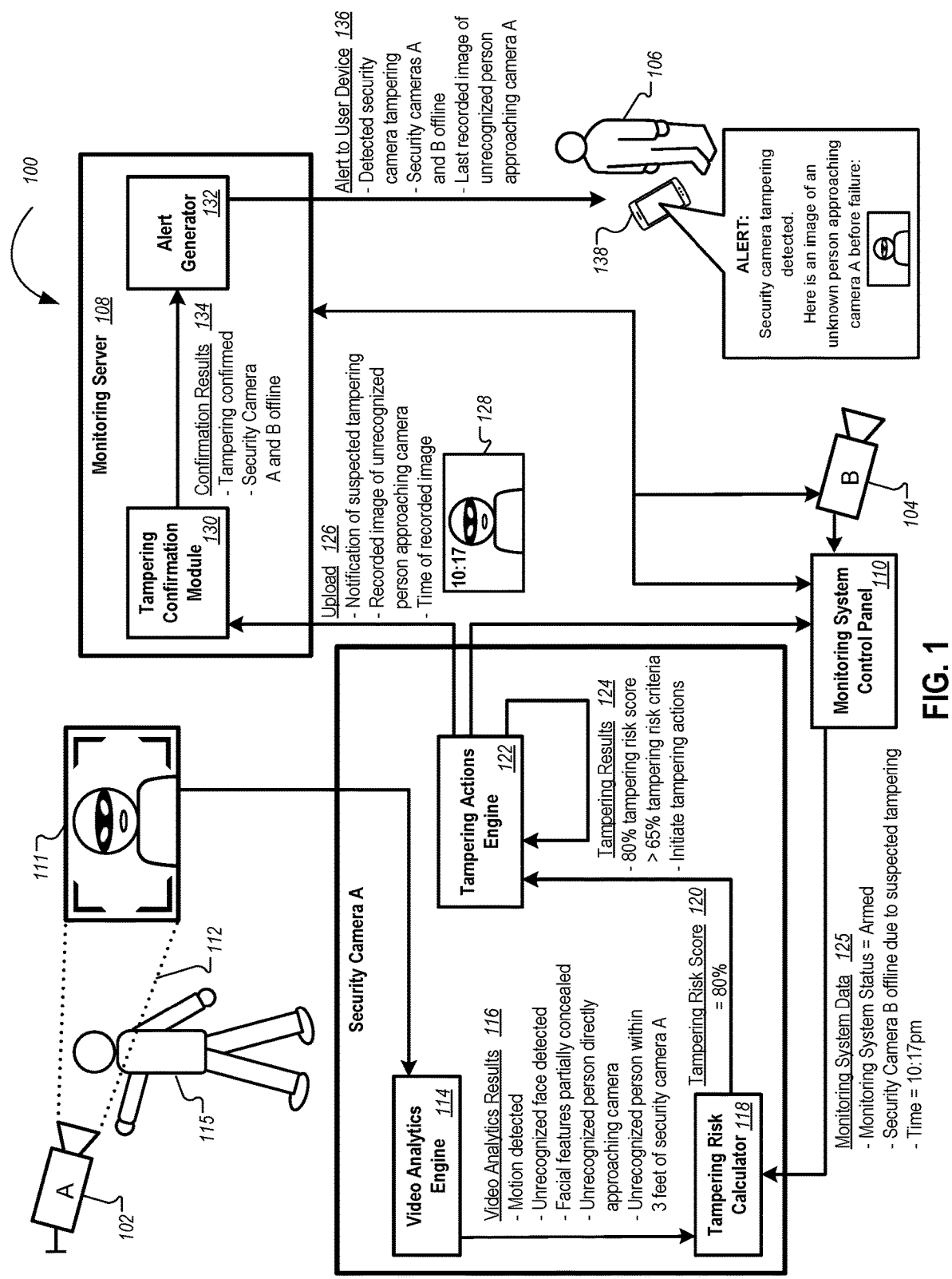
FIG. 1 illustrates an example operating environment for notifications for camera tampering.

FIG. 1 illustrates an example operating environment 100 for notifications for camera tampering.

In FIG. 1, the security cameras A and B 102, 104 monitor areas of a property and are in communication with a monitoring system control panel 110. For example, the security camera A may monitor a living room and security camera B may monitor a kitchen. The property may be a home, another residence, a place of business, a public space, or another facility that is monitored by a monitoring system. A user 106 of the security cameras A and B 102, 104 may be, for example, a resident, landlord, or tenant of the property. The security cameras A and B 102, 104, and the monitoring system control panel 110, connect to a monitoring server 108.

The monitoring server 108 may be, for example, one or more computer systems, server systems, or other computing devices that are located remotely from the property and that are configured to process information related to the monitoring system at the property. For example, the monitoring server 108 may be a cloud computing platform that is remote from the property. The security cameras A and B 102, 104, may be in communication with the monitoring server 108 over any appropriate long-range data link. The long-range data link may include any combination of wired and wireless data networks.

The security camera A 102 may capture images 111 of objects within the field of view 112 of the security camera A 102. For example, the security camera A 102 may capture images of a tamperer 115 approaching the security camera A 102. A tamperer may be a person that tampers with a security camera. Tampering with a camera may include one or more of moving, covering, damaging, or turning off the camera. Tampering with a camera can also be any action that results in corrupting, altering, or impeding the camera.

The security camera A 102 includes a video analytics engine 114, a tampering risk calculator 118, and a tampering actions engine 122. The video analytics engine 114 performs video analysis on the images 111 captured by the security camera A 102. The video analytics engine 114 may perform video analysis on the images 111 to detect and identify objects within the field of view 112 of the security camera A 102. For example, the video analytics engine 114 may detect and identify animals, vehicles, and people, such as the tamperer 115, within the field of view 112. The video analytics engine 114 may also identify objects such as tools or weapons within the image 111. The video analytics engine 114 may detect motion and track the direction of movement of objects within the field of view 112. For example, the video analytics engine 114 can determine if the tamperer 115 is moving toward the security camera A 102, and can determine the tamperer's speed of movement, direction of approach, and distance from the security camera A 102.

The video analytics engine 114 may perform facial recognition on the tamperer's face within the field of view 112. Based on referencing a database of familiar faces, e.g., of friends, family members, and/or maintenance personnel, the video analytics engine 114 can determine if the tamperer 115 is a familiar person or a stranger. The video analytics engine 114 can also determine if the tamperer 115 is concealing any part of his or her face. The video analytics engine 114 can also determine if the tamperer 115 is looking in the direction of the security camera A 102 and/or reaching toward the security camera A 102.

The video analytics engine 114 produces video analytics results 116. The video analytics results 116 indicate that motion is detected within the field of view 112 of the security camera A 102. The video analytics results 116 also indicate the detection of an unrecognized, partially concealed face belonging to the tamperer 115. The video analytics results 116 indicate that the tamperer 115 with the unrecognized face is approaching the security camera A 102, and is at a distance of 3 feet from the security camera A 102.

The tampering risk calculator 118 receives the video analytics results 116 and assesses the video analytics results 116 to calculate the tampering risk score 120 for the security camera A 102. For example, the tampering risk calculator 118 may determine that the video analytics results 116 indicate that motion was detected, an unrecognized face was detected, the facial features were partially concealed, the unrecognized person directly approached the camera, and the unrecognized person is within three feet of the camera and, in response, calculate a tampering risk score 120 of 80%.

In another example, the video analytics engine 114 produces video analytics results 116 that indicate the detection of a person with a recognized, fully exposed face. The video analytics results 116 indicate that the person with the recognized face moves past the security camera A 102 at a steady distance of 10 feet from the security camera A 102. The tampering risk calculator 118 assesses the video analytics results 116 to calculate the tampering risk score 120 for the security camera A 102. For example, the tampering risk calculator 118 may determine that the video analytics results 116 indicate that motion was detected, a recognized face was detected, the facial features were fully exposed, the recognized person moved past the camera, and the recognized person maintained a steady distance of 10 feet from the camera, and, in response, calculate a tampering risk score 120 of 10%.

To calculate the tampering risk score 120, the tampering risk calculator 118 assesses the video analytics results 116. The tampering risk calculator 118 may assess factors such as the presence of the unrecognized tamperer 115, the direction and speed of approach of the tamperer 115, the distance from the security camera A 102 to the tamperer 115, the tamperer 115's facial expressions, and concealment of the tamperer 115's facial features. Additional factors that the tampering risk calculator 118 may asses may include the presence of objects within the field of view 112, such as tools or weapons, and any actions that the tamperer 115 may be taking, such as swinging a weapon toward the security camera A 102.

The tampering risk calculator 118 may also receive monitoring system data 125 from the monitoring system control panel 110. The monitoring system data 125 may include, for example, the status of the monitoring system, the status of individual components of the monitoring system, e.g., the security camera B 104, and date, time, and location information. The monitoring system data 125 indicates that the monitoring system is armed, the security camera B 104 is offline due to suspected tampering, and the time is 10:17 pm.

To calculate the tampering risk score 120, the tampering risk calculator 118 may also assess the monitoring system data 125. The tampering risk calculator 118 may assess factors including the status of other components of the monitoring system. For example, the tampering risk calculator 118 may determine an increased tampering risk score 120 for the security camera A 102 due to the suspected tampering of the security camera B 104. The tampering risk calculator 118 may assess data from other sensors connected to the monitoring system. For example, glass break sensors may indicate that glass has broken at the property and the tampering risk calculator 118 may determine an increased tampering risk score 120 for the security camera A 102 due to the broken glass, which may indicate that a burglary or intrusion may be in progress.

The tampering risk calculator 118 may correlate the video analytics results 116 with the monitoring system data 125 to assess if the actions of the tamperer 115 have affected components of the monitoring system. For example, the video analytics results 116 may indicate that the tamperer 115 has approached a motion sensor that is part of the monitoring system. The monitoring system data 125 might then indicate that the motion sensor has dropped offline. The tampering risk calculator 118 may correlate the video analytics results 116 with the monitoring system data 125 to determine that the tamperer 115 has approached and then tampered with the motion sensor. The tampering risk calculator 118 may then increase the tampering risk score 120 for the security camera A 102 due to the suspected tampering of the motion sensor.

The tampering actions engine 122 compares the tampering risk score 120 to tampering risk criteria to obtain tampering results 124. The tampering risk criteria may be a threshold tampering risk score 120. For example, the tampering actions engine 122 may compare a tampering risk score of 80% with tampering risk criteria of 65% to obtain a tampering result of "Tampering likely to occur."

The tampering risk criteria may be pre-programmed by the manufacturer, installer, or operator of the security camera A 102, and/or may be based on input from the user 106. In some examples, the tampering risk criteria may be based on the monitoring system status. For example, the tampering risk criteria may be set to a lower value when the monitoring system status is "Armed," compared to when the monitoring system status is "Disarmed." In some examples, the tampering risk criteria may be based on an automation scene. For example, when an automation scene for "Sleep" is selected by a user, the tampering actions engine 122 may lower the tampering risk criteria. When an automation scene for "Dinner Time" is selected by a user, the tampering actions engine 122 may raise the tampering risk criteria.

The tampering risk calculator 118 may continuously calculate the tampering risk score 120 and compare the tampering risk score 120 to the tampering risk criteria. For example, the tampering risk calculator 118 may continuously assess the video analytics results 116 and the monitoring system data 125 to calculate a running tampering risk score 120 and obtain tampering results 124. In some examples, the tampering actions engine 122 may be programmed to initiate tampering actions any time the tampering risk score 120 exceeds the tampering risk criteria. In some examples, the tampering actions engine 122 may be programmed to initiate tampering actions if the tampering risk score 120 exceeds the tampering risk criteria for a certain time interval. In some examples, the tampering actions engine 122 may be programmed to initiate tampering actions if an average tampering risk score 120 over a certain time interval exceeds the tampering risk criteria.

Based on the tampering results 124, the tampering actions engine 122 may initiate tampering actions. Tampering actions may include initiating recording video with the security camera A 102. For example, the security camera A 102 may be programmed with a non-recording rule that the security camera A 102 does not record unless the monitoring system status is "Armed Away." Thus, if a potential tampering event occurs while the monitoring system status is "Armed Stay," the security camera A 102 will not record video of the tamperer. A user may have the option to program the tampering actions engine 122 to override the non-recording rule in order to record video if the risk of tampering exceeds a threshold. The threshold may be adjustable based on user preferences. For example, the user may set preferences that the security camera A 102 initiates recording video if the tampering risk score 120 exceeds 70% when the monitoring system status is "Armed Away," and initiates recording video if the tampering risk score 120 exceeds 80% when the monitoring system status is "Armed Stay."

Tampering actions include uploading 126, to the monitoring server 108, a notification of suspected tampering. The tampering actions engine 122 may also upload 126 camera data 128 to the monitoring server 108. The camera data 128 can include, for example, the image 111 and a time stamp for the image 111. The camera data 128 can also include a video and/or audio recording of the tamperer 115 approaching the security camera A 102.

During normal operation, a security camera may record and store video faster than can be uploaded to the monitoring server 108. To save network bandwidth, security cameras may record short video buffers, e.g., 30 seconds, which are not uploaded. In the seconds leading up to a tampering event, a short video buffer may contain evidence of the method of tampering and the identity of the tamperer 115. When the tampering risk score 120 exceeds the tampering risk criteria, the tampering actions engine 122 may upload 126 the video buffer to the monitoring server 108, based on the available resources and the estimates of the remaining time before tampering.

The security camera A 102 may use the tampering risk score as a means to assess how much time is available before tampering occurs. For example, the security camera A 102 may associate a higher tampering risk score 120 with a lesser amount of time remaining before tampering. The security camera A 102 may calculate an estimated time remaining based on the video analytics result 116. For example, the security camera A 102 may calculate an estimated time remaining based on the tamperer's distance from the security camera A 102, and the tamperer's speed and direction of approach.

The security camera A 102 may calculate a greater time remaining before tampering if the security camera A 102 is not easily reachable, e.g., if the security camera A 102 is located in an elevated position or within a protected enclosure. In some examples, the security camera A 102 may determine that the security camera A 102 is not easily reachable based on pre-programmed settings. For example, upon installation, the user 106 may select monitoring system settings that establish the elevation and location of the security camera A 102. In some examples, the security camera A 102 may determine that the security camera A 102 is not easily reachable based on video analytics. For example, the video analytics engine 114 of the security camera A 102 may estimate the elevation of the security camera A 102 based on performing video analysis on the images 111 from the security camera A 102. The security camera A 102 may then calculate a greater time remaining before tampering based on a greater elevation of the security camera A 102.

The security camera A 102 may prioritize portions of the uploaded camera data 128, or replace certain imagery with lightweight metadata. For example, the security camera A 102 might only have time to upload 126 a high resolution image of the tamperer 115's detected face, along with tracking data showing the direction of approach to the security camera A 102. The security camera A 102 can continue to upload 126 camera data 128 to the monitoring server 108 until the security camera A 102 goes offline.

A false alarm may occur if the tampering actions engine 122 initiates tampering actions and the security camera A 102 remains online. In the event of a false alarm, the security camera A 102 can continue to upload 126 camera data 128 to the monitoring server 108 until the tampering risk score 120 drops below the tampering risk criteria. The security camera A 102 can then send a signal, e.g., an "all clear" message, to the monitoring server. The security camera A 102 may then resume normal operation.

Tampering actions may include sending a notification of suspected tampering to the monitoring system control panel 110. The monitoring system control panel 110 receives the notification of suspected tampering and may send the notification to other components of the monitoring system, e.g., additional security cameras. The tampering risk scores for the additional security cameras then increase, and the additional security cameras may initiate tampering actions. This results in a "high alert" status for the monitoring system, with all security cameras recording and uploading 126 camera data 128 to the monitoring server 108. The monitoring system may prioritize the camera data 128 from multiple security cameras. For example, the monitoring system may prioritize the upload 126 of camera data 128 that includes an image of the tamperer 115, over camera data 128 that does not include an image of the tamperer 115.

In some examples, the security camera A 102 may include a battery that can provide power for sending a distress message after a tampering event occurs. For example, if the tamperer 115 disconnects the security camera A 102, the battery can enable the security camera A 102 to continue to upload 126 camera data 128 for a short amount of time while disconnected. While on battery power, the security camera A 102 may be able to upload 126 camera data 128 to the monitoring server 108 using a wireless network.

The monitoring server 108 receives the camera data 128. The monitoring server 108 includes a tampering confirmation module 130 that can analyze the camera data 128. The monitoring server 108 can perform a more detailed analysis on the camera data 128, compared to the security camera A. The monitoring server 108 may analyze the camera data 128 using additional information from other monitoring system components and/or other monitoring systems, including historical data. For example, the monitoring server 108 may reference data regarding equipment reliability history such as mean time between failures (MTBF) for security cameras. The monitoring server 108 may access additional information regarding network status and local power outages. The monitoring server 108 may also determine whether, and when, the security camera A 102 loses power or otherwise drops offline. The monitoring server 108 can use the multiple data sources and computationally intensive algorithms to make an accurate determination regarding whether a tampering event is likely to occur or has occurred.

In some implementations, the monitoring server 108 may use a machine learning model to improve the accuracy of the tampering determination. For example, in a retail setting, a security camera may typically detect many people with unfamiliar faces during business hours. However, after business hours, it may be rare for the security camera to detect an unfamiliar face. The monitoring server 108 can learn the typical routine including the number of people that are expected at various times of day. The monitoring server 108 can then analyze the camera data 128 to determine when the security camera detects a deviation from routine events. For example, the monitoring server 108 may determine that the tampering risk is higher when an unfamiliar face is detected after business hours, compared to during business hours.

The tampering confirmation module 130 produces confirmation results 134. The confirmation results 134 may be a confirmation that tampering is likely or has occurred, or a rejection that tampering is likely or has occurred. The confirmation results 134 confirm that tampering has occurred. The confirmation results 134 also confirm that both the security cameras A and B 102, 104, are offline due to tampering. Based on the confirmation of tampering, the alert generator 132 generates tampering alerts to send to the user 106.

The alert generator 132 may send an alert 136 to the user device 138. The alert 136 may include a notification of detected tampering, and the status of various components of the monitoring system. The alert 136 may also include an image 111 of the tamperer 115. The alert 136 displays on the user device 138. Based on user preferences, the alert may also be displayed on the monitoring system control panel 110.

In some implementations, a camera may be able to analyze its functional state after a tampering incident has occurred. The suspected tampering event can trigger a system diagnostic to run on the camera. The system diagnostic could include verifying connectivity, cycling illuminators, activating pan-tilt-zoom (PTZ) functionality, or performing additional analytics to look for changes in the environment. For example, the camera may have been moved or occluded, but the camera may still have power and may still be able to communicate with components of the monitoring system. If the camera has power, the camera can save and upload the final images before tampering, as well as the exact time of the tampering. If the image sensor or other components of the camera are malfunctioning or unresponsive after tampering, the camera can report the status of each component to the monitoring server 108.

If the camera continues to capture imagery following a tampering incident, the camera may be able to continue to perform video analysis to determine if the lens or housing has been damaged, if the lens has been completely or partially occluded or obscured, or if the camera has been moved to a new orientation or location. If any of the original view is still visible within the field of view of the camera, the camera can assess whether or not the camera can continue to perform its designated functions, as defined by preset rules. For example, if the camera is programmed with rules that involve monitoring the threshold of a doorway, the camera can determine if the field of view still includes the doorway after the tampering incident. The camera can upload its functional assessment, as well as any available imagery, to the monitoring server 108 for further analysis. The monitoring server 108 may use machine learning, for example, a trained neural network, to differentiate between lens damage and occlusion. The monitoring server 108 may also compare the post-tampering images with a stored library of images from the camera, in order to evaluate the continued functionality of the camera.

In some implementation, the tampering actions engine 122 may upload the camera data 128 to a local node of the monitoring system instead of, or in addition to, the monitoring server 108. For example, the tampering actions engine 122 may upload the camera data 128 to the monitoring system control panel 110 or to another security camera at the same property. The tampering actions engine 122 may be able to upload the camera data 128 to a local node more quickly than uploading to the monitoring server 108.

In some implementations, the local node may be a separate module from the imaging component of the camera that includes some elements related to video storage, processing, and/or communications. The separate module may be located in a more secure location compared to the imaging component of the camera, e.g., higher in elevation, or in a secure wiring box. If the imaging component is tampered with, the separate module may remain functional, and may be able to upload camera data 128 to the monitoring server 108 before, during, and after tampering.

In some implementations, a camera may use a short range connection, such as Bluetooth, to send a small amount of camera data, e.g., a few frames of video or a snapshot, to a small storage device. The small storage device may transmit the small amount of camera data to the monitoring server 108 or to a local node of the monitoring system, e.g. the monitoring system control panel 110. Caching camera data in a local node can improve video processing and storage in cases where the communications with the monitoring server 108 is slow, latent, or unreliable. Caching camera data in a local node can enable more frequent transmission of data, and can improve data transmission during equipment failures. Caching camera data in a local node also may allow data to be stored securely on a property in the case where a tamperer has disabled network connections.

In some implementations, a camera can perform an assessment to differentiate between deliberate tampering and accidental interference. For example, a camera may receive monitoring system data indicating adverse local weather conditions, such as wind, rain, and snow. A camera may also identify adverse weather conditions using video analytics. For example, the camera may identify trees swaying in an outdoor scene, indicating heavy winds. These adverse weather conditions might cause a camera outage and/or camera damage. If a camera outage occurs during adverse weather conditions, the camera can determine that there is a higher probability that the outage was caused by the adverse weather conditions, and a lower probability that the outage was caused by tampering.

In some implementations, the data from the tampering analysis may be used to prioritize notifications. For example, notifications regarding a suspected deliberate tampering incident may be prioritized over notifications regarding an accidental interference incident. Likewise, notifications regarding a total loss of imagery may be prioritized over notifications regarding slight camera movement. For very small camera movements, notifications may be disabled, particularly if the camera can continue to perform its designated functions.

In some implementations, the security camera A 102 may send periodic status messages to the monitoring server 108 to report that the security camera A 102 is connected and functioning. The security camera A 102 may also report more detailed information to the monitoring server 108, e.g., the network signal strength, battery levels, and tampering risk scores 120. The monitoring server 108 may also request data from the security camera A 102 at any time. If the security camera A 102 does not respond to a request from the monitoring server 108, it may be an indication that the security camera A 102 has already been tampered with. In response to the security camera A 102 not responding to the request from the monitoring server 108, the monitoring server 108 may review past data that was uploaded from the security camera A 102. The monitoring server 108 may also review data from additional components of the monitoring system to determine if a tampering event may have occurred.

Figure 2:
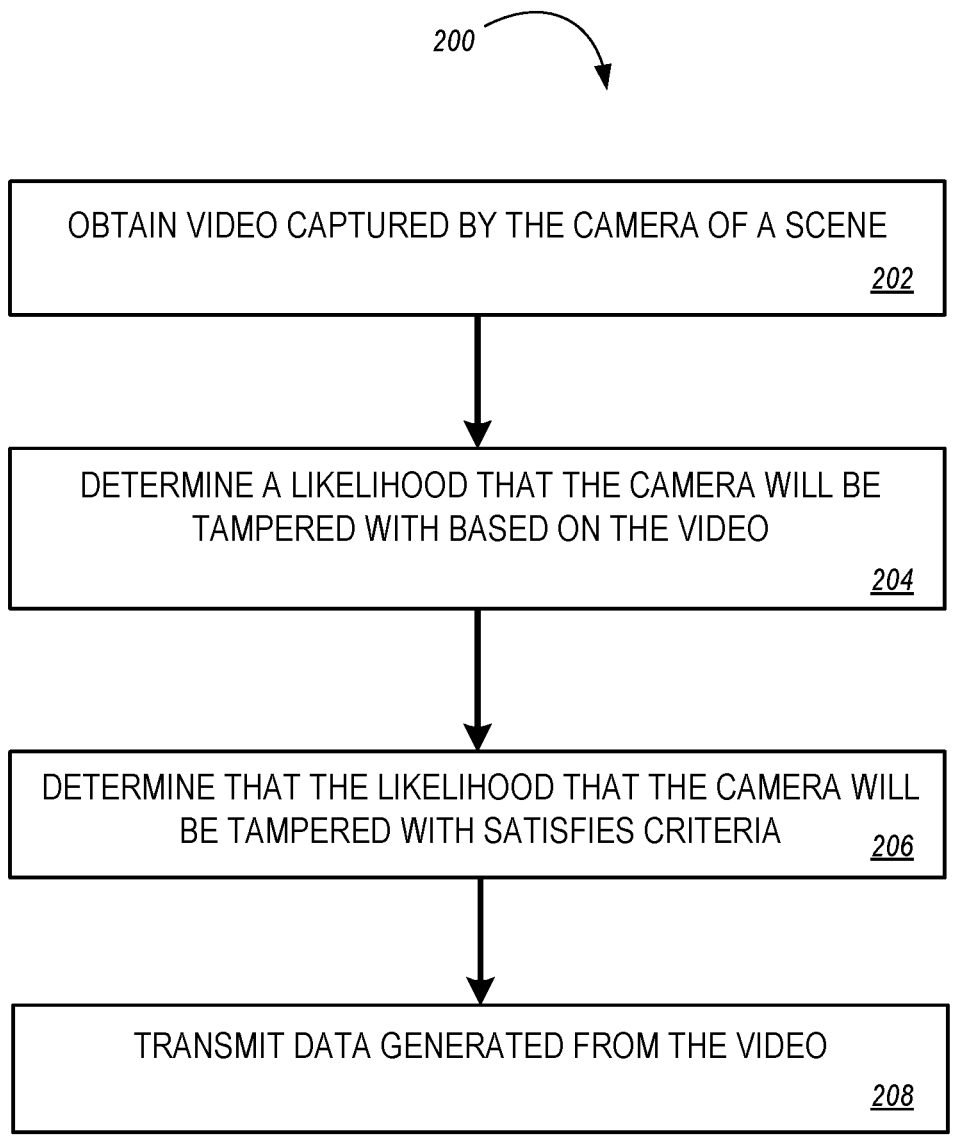
FIG. 2 is a flowchart of an example process for notifications for camera tampering.

FIG. 2 is a flowchart of an example process 200 for notifications for camera tampering. The process 200 can be performed by one or more computer systems, for example, the security camera A 102, the security camera B 104, or the monitoring system control panel 110. In some implementations, some or all of the process 200 can be performed by the monitoring server 108, or by another computer system located at the monitored property.

Briefly, the process 200 includes obtaining video captured by the camera of a scene (202), determining a likelihood that the camera will be tampered with based on the video (204), determining that the likelihood that the camera will be tampered with satisfies criteria (206), and transmitting data generated from the video (208).

The process 200 includes obtaining video captured by the camera of a scene (202). The camera can be, for example, the security camera A 102. The scene can be an indoor or outdoor scene at a property monitored by a monitoring system. The security camera A 102 may capture video of one or more people or objects within the field of view. For example, the security camera A 102 may capture images of the tamperer 115 approaching the security camera A 102. A tamperer may be a person that tampers with a security camera. Tampering with a camera may include one or more of moving, covering, damaging, or turning off the camera.

The process 200 includes determining a likelihood that the camera will be tampered with based on the video (204).

For example, the video analytics engine 114 of the security camera A 102 may perform video analysis on the video to produce video analytics results 116. The video analytics engine 114 may detect, identify, and track the movement of people, animals, vehicles, and objects within the field of view of the security camera A 102.

Determining a likelihood that the camera will be tampered with can include determining a likelihood that the camera will be moved, occluded, damaged, destroyed, disconnected, or stolen. For example, the tamperer 115 may intend to move the camera A 102 so that the camera A 102 no longer captures images of the scene. The tamperer 115 may also intend to occlude the camera A 102, e.g., by covering the lens of the camera A 102 or by placing an occluding object within the field of view of the camera A 102.

In another example, the tamperer 115 may intend to disconnect the camera A 102 from a power source or tamper with a part of the system infrastructure that the camera depends upon. For example, the tamperer 115 may intend to unplug a power cable, cut a power cable, or destroy a network box that is near the camera A 102.

Determining the likelihood that the camera will be tampered with based on the video of the scene can include determining, using video analysis, that a person depicted within the scene is approaching the camera, or a system component that the camera depends upon to operate.

Determining that the person depicted within the scene is approaching the camera can include determining a speed of approach, a direction of approach, a distance from the camera, a movement of a limb, and/or an eye direction of the person. For example, the system may determine that the tamperer 115 is approaching the camera A 102 at a direct angle and at a speed of four miles per hour. The system may determine a distance between the camera A 102 and the tamperer 115 of ten feet. The system may determine that the tamperer 115 is raising an arm to reach toward the camera A 102, and that the tamperer's eyes are directed toward the camera A 102. The system may determine a higher likelihood that the camera A 102 will be tampered with when the person depicted within the scene is approaching the camera A 102 and looking at the camera A 102, compared to when the person depicted within the scene is passing by the camera A 102 and/or not looking at the camera A 102.

Determining the likelihood that the camera will be tampered with based on the video of the scene can include determining that a person depicted within the scene is an unrecognized, unauthorized, or unexpected person. For example, the system may store a database of images of recognized people, e.g., people associated with the system. For example, the recognized people may be residents of a property where the system is located. The system may also store a database of images of authorized people, e.g., people who are authorized to be in the area near the camera. The system can use video analysis to compare an image of the tamperer 115 with the database of recognized people. If the image of the tamperer 115 does not match any of the images of recognized people, the system can determine that the tamperer 115 is an unrecognized person.

Determining that the person depicted within the scene is an unrecognized person can include determining that at least part of the person's face is concealed. For example, the camera A 102 may determine that the tamperer 115 is wearing a covering over the tamperer's eyes or mouth. In some cases, the camera 102 may differentiate between a normal face covering vs. an unexpected use of a face covering. For example, a normal face covering may be a covering that covers the tamperer's mouth and nose. An unexpected face covering may be a covering that covers more of the face than expected, e.g., a ski mask or mask that covers the tamperer's eyes.

The system may determine a higher likelihood that the camera A 102 will be tampered with when the person depicted within the scene is an unrecognized person, compared to when the person depicted within the scene is a recognized person.

The security camera A 102 may perform facial recognition on the tamperer 115 to determine if the tamperer 115 has a recognized, unrecognized, and/or concealed face. Based on the video analytics results 116, the tampering risk calculator 118 can calculate the tampering risk score 120, indicating the likelihood that the security camera A 102 will be tampered with. For example, the tampering risk calculator 118 may determine that the video analytics results 116 indicate that motion is detected, the tamperer 115's face is unrecognized, the tamperer 115's facial features are partially concealed, and the tamperer 115 is directly approaching the camera and, in response, calculate a tampering risk score 120 of 80%.

The process can include receiving, by the system, system data indicating a status of one or more system components. Based on the video of the scene and the status of the one or more system components, the system can determine the likelihood that the camera will be tampered with. The status of the one or more system components can include an arming status of a monitoring system that is configured to monitor a location of the scene. For example, the monitoring system status may be armed or unarmed. The system may determine a higher likelihood that the camera will be tampered with when the monitoring system is armed compared to when the monitoring system is unarmed.

The status of the one or more system components can include a status of one or more additional cameras. The system can determine, based on the status of the one or more additional cameras, that the one or more additional cameras was tampered with. Based on determining that the one or more additional cameras was tampered with, the system can determine the likelihood that the camera will be tampered with. For example, the status of camera B 104 may be that the camera B 104 is offline. The system may determine that the camera B 104 was tampered with. Based on determining that the camera B 104 was tampered with, the system can determine the likelihood that the camera A 102 will be tampered with. The system may determine a higher likelihood that the camera A 102 will be tampered with when the camera B 104 has been tampered with, compared to when the camera B 104 has not been tampered with.

The process 200 includes determining that the likelihood that the camera will be tampered with satisfies criteria (206). The tampering risk criteria may be pre-programmed by a manufacturer, installer, or operator, and/or may be based on input from a user.

Determining that the likelihood that the camera will be tampered with satisfies the criteria can include determining a risk score of camera tampering. The system can determine that the risk score exceeds a threshold risk score. Based on determining that the risk score exceeds the threshold risk score, the system can determine that the likelihood that the camera will be tampered with satisfies the criteria. For example, the tampering actions engine 122 may compare a tampering risk score of 80% for camera A 102 with threshold risk score of 65% and determine that the risk score exceeds the threshold risk score. Based on determining that the risk score exceeds the threshold risk score, the system can determine that the likelihood that the camera A 102 will be tampered with satisfies the criteria. The system may obtain a tampering result of "Tampering likely to occur."

The process can include, in response to determining that the likelihood that the camera will be tampered with satisfies a criteria, estimating, using video analysis, a time that camera tampering will likely occur. For example, the system may determine that the tamperer 115 is twenty feet away from the camera A 102 and is moving directly toward the camera A 102 at a speed of five feet per second. Thus, the system may determine that camera tampering will likely occur in four seconds.

The process can include, after determining that the likelihood that the camera will be tampered with satisfies criteria, analyzing a functional state of the camera. Based on analyzing the functional state of the camera, the system can determine that the camera was tampered with. In response to determining that the camera was tampered with, the system can perform a system action. For example, the system may analyze the functional state of the camera A 102 and determine that the camera A 102 has lost power. Based on determining that the camera A 102 has lost power, the system may determine that the camera A 102 was tampered with. In response to determining that the camera A 102 was tampered with, the system can perform a system action. For example, the system action may include generating and sending an alert 136 to a user device 138 indicating that tampering has occurred.

The process 200 includes transmitting data generated from the video (208). The data generated from the video may be, for example, the camera data 128. The camera data 128 may include the image 111 from the video, a time stamp, and/or a notification of suspected tampering. The camera data 128 can include a video and/or audio recording of the tamperer 115 approaching the security camera A 102. The security camera A 102 camera may upload the data generated from the video to the monitoring server 108, the monitoring system control panel 110, and/or to another component of the monitoring system.

Transmitting the data generated from the video can include transmitting, to a server and from the system, a notification of likely camera tampering. For example, the system can transmit a message to the monitoring server 108 indicating that the camera A 102 has been tampered with, has likely been tampered with, or will likely be tampered with.

The process can include determining, based on the estimated time that the camera will be tampered with, a size of data that is capable of transmission before the estimated time that the camera will be tampered with. Based on determining the size of data that is capable of transmission before the estimated time that the camera will be tampered with, the system can select a subset of data to transmit. The subset of data has a size that is less than the size of data that is capable of transmission before the estimated time. For example, the system may determine that the camera A 102 will likely be tampered with in four seconds. The system may determine a size of data of two hundred megabits that is capable of transmission within four seconds. Based on determining that two hundred megabits of data is capable of transmission within four seconds, the system can select a subset of data that is less than two hundred megabits.

The system may select the subset of data by prioritizing certain data. For example, the system may prioritize a clear image of the tamperer 115 over a blurry image of the tamperer 115. The system may also prioritize a high resolution single image of the tamperer's face over low resolution video of the tamperer 115. The system may also prioritize more recent images over older images. For example, the system may prioritize an image of the tamperer 115 at a distance of twenty feet from the camera A 102 over an image of the tamperer 115 at a distance of thirty feet from the camera A 102. In some examples, the system may select to transmit a longer length of reduced quality video of the tamperer 115 to the monitoring server 108 rather than transmitting a shorter length of high quality video. In some examples, the system may select one or more images that show a clear depiction of the tamperer's face. The system may crop the one or more images to include only the depiction of the face, and may transmit the cropped image or images to the monitoring server 108.

Transmitting the data generated from the video can include transmitting, in real-time, the data generated from the video. For example, the system may normally store video data in a buffer instead of, or prior to, transmitting the video data. Upon determining that camera tampering is likely to occur, the system can transmit the video data to the monitoring server 108 in real-time. The system may reduce the video quality in order to transmit the video data prior to tampering occurring.

In some examples, the system may transmit a combination of real-time video data and stored video data. For example, the system may transmit real-time video to the monitoring server 108 along with buffered video, e.g., one buffered video image frame for each ten real-time video image frames. In this way, the system can transmit video data representing the tampering event as it occurs in real-time, as well as stored video data representing a period of time leading up to the tampering event.

In some examples, the system can transmit real-time video data while also storing the video data in a buffer. For example, the system may transmit reduced quality video data or image snapshots of the video to the monitoring server 108. The system can simultaneously store the corresponding high quality video data in the buffer. If the camera remains functional after the tampering event, or if the tampering event does not occur, the system can later transmit the high quality video data to the monitoring server 108 from the buffer.

The process can include determining that the camera was not tampered with or that the likelihood that the camera will be tampered with no longer satisfies criteria. In response to determining that the camera was not tampered with or that the likelihood that the camera will be tampered with no longer satisfies criteria, the system can transmit a notification that the camera was not tampered with or that the likelihood that the camera will be tampered with no longer satisfies the criteria.

In some examples, the server may delay performing a system action upon receiving a notification of camera tampering. For example, the system may transmit the notification of likely camera tampering to the monitoring server 108. The notification may indicate that that tampering event is likely to occur within five seconds. The monitoring server 108 may delay sending the alert 136 to the user device 138 for a time delay, e.g., a delay of ten seconds. After the time delay, if the monitoring server 108 does not receive additional information, the monitoring server 108 can proceed to send the alert 136 to the user device 138. If, prior to the completion of the ten second time delay, the monitoring server 108 receives a notification that the camera was not tampered with, or that the camera is not likely to be tampered with, the monitoring server 108 can cancel the alert 136, and not send the alert 136 to the user device 138. Delaying the system action can reduce the number of false alerts generated by the monitoring server 108.

In some cases, in response to determining that the camera was not tampered with or that the likelihood that the camera will be tampered with no longer satisfies criteria, the system may cease transmitting real-time video data. The system may instead transmit video data that was stored prior to determining that the likelihood that the camera will be tampered with satisfied criteria.

For example, the system may determine that the camera A 102 was not tampered with. In response to determining that the camera A 102 was not tampered with, the system may transmit a notification that the camera A 102 was not tampered with to the monitoring server 108. The system can then transmit, to the monitoring server 108, the video data that was stored in the buffer prior to the suspected tampering event. The video data that was stored in the buffer may include video data from a time period, e.g., several seconds, before the system determined that the tampering event was likely to occur. In some examples, in response to determining that the camera was not tampered with, the system can transmit a message to the monitoring server 108 indicating that the camera was not tampered with.

The process can include, in response to transmitting the data generated from the video, receiving a confirmation that the camera was tampered with. In response to receiving the confirmation that the camera was tampered with, the system can perform a system action. For example, the system can perform a system action of sending the alert 136 to the user device 138 that indicates that camera tampering occurred.

In another example, the system may perform a system action to compensate for the camera tampering. For example, the system may adjust or activate one or more additional cameras that remain functional in order to capture images of the scene that is no longer monitored by the camera A 102. This can include panning a PTZ camera or repositioning a drone-mounted camera.

In some examples, the system can adjust settings of other sensors in response to receiving confirmation that the camera was tampered with. For example, a motion sensor may be located near the camera. During normal operation, the system may be programmed to trigger an alert when motion sensor data and video data from the camera both detect an event. When the camera is tampered with, system settings can adjust to rely solely on the motion sensor. Thus, the motion sensor can trigger an alert even in the absence of video verification from the camera.

In some examples, based on analyzing the functional state of the camera, the system can determine that the camera was not tampered with. In response to determining that the camera was not tampered with, the system can transmit a notification that the camera was not tampered with. For example, the system may analyze the functional state of the camera A 102 and determine that the camera A 102 is functioning normally. Thus, the system can determine that the camera A 102 was not tampered with. In response to determining that the camera A 102 was not tampered with, the system may transmit a notification to the monitoring server 108 indicating that the camera A 102 was not tampered with. In some examples, in response to determining that the camera A 102 was not tampered with, the system may cease transmitting the data generated from the video. For example, the system may cease transmitting the data to the monitoring server 108 in real-time, and may instead transmit buffered video data. In some examples, the system may cease transmitting data to the monitoring server 108 in real-time and may store the video data in a buffer.

Figure 3:
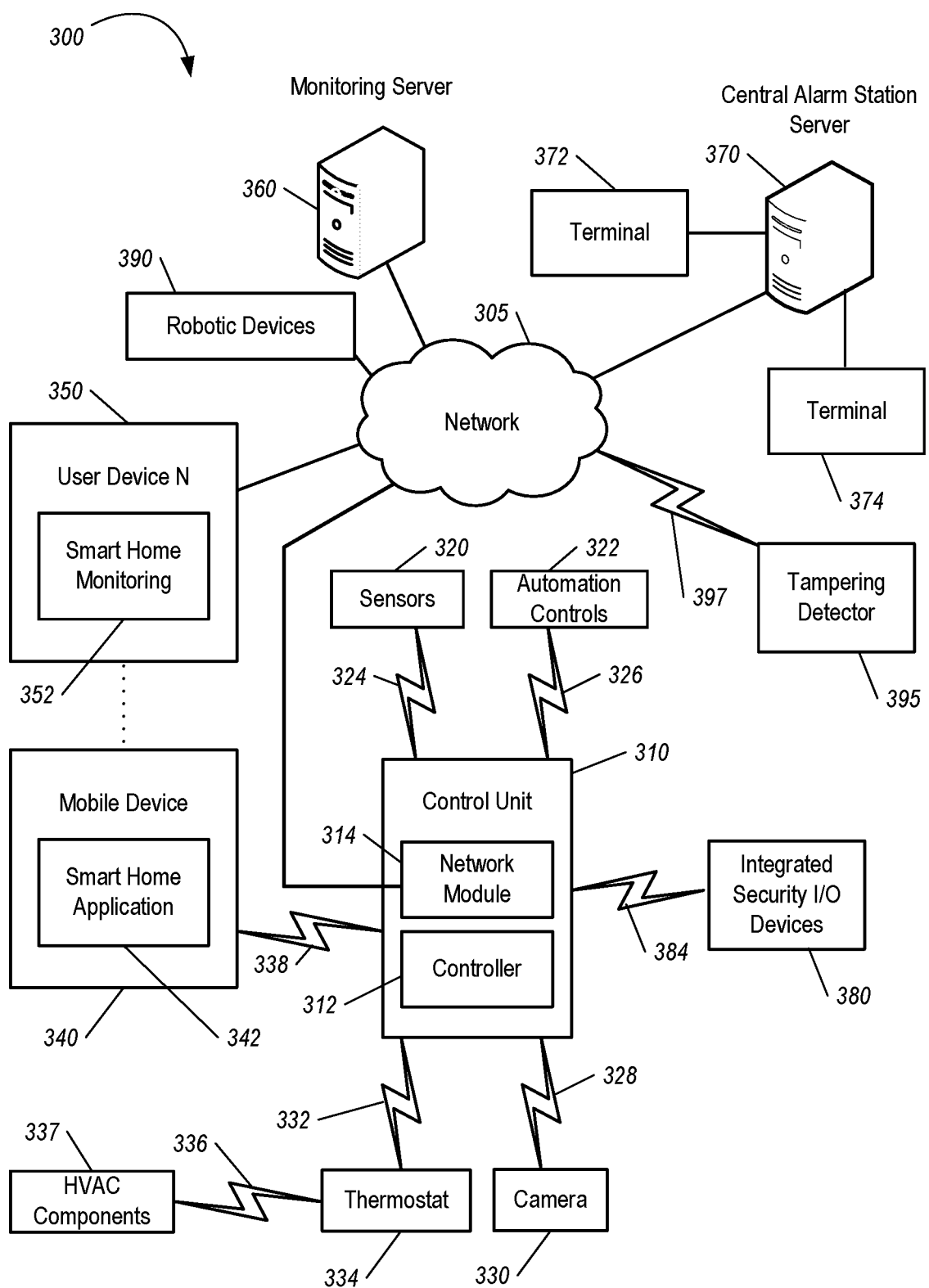
FIG. 3 is a diagram illustrating an example of a home monitoring system.

FIG. 3 is a diagram illustrating an example of a home monitoring system 300. The monitoring system 300 includes a network 305, a control unit 310, one or more user devices 340 and 350, a monitoring server 360, and a central alarm station server 370. In some examples, the network 305 facilitates communications between the control unit 310, the one or more user devices 340 and 350, the monitoring server 360, and the central alarm station server 370.

The network 305 is configured to enable exchange of electronic communications between devices connected to the network 305. For example, the network 305 may be configured to enable exchange of electronic communications between the control unit 310, the one or more user devices 340 and 350, the monitoring server 360, and the central alarm station server 370. The network 305 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 305 may include multiple networks or subnetworks, each of which may include, for example, a wired or wireless data pathway. The network 305 may include a circuit-switched network, a packet-switched data network, or any other network able to carry electronic communications (e.g., data or voice communications). For example, the network 305 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 305 may include one or more networks that include wireless data channels and wireless voice channels. The network 305 may be a wireless network, a broadband network, or a combination of networks including a wireless network and a broadband network.

The control unit 310 includes a controller 312 and a network module 314. The controller 312 is configured to control a control unit monitoring system (e.g., a control unit system) that includes the control unit 310. In some examples, the controller 312 may include a processor or other control circuitry configured to execute instructions of a program that controls operation of a control unit system. In these examples, the controller 312 may be configured to receive input from sensors, flow meters, or other devices included in the control unit system and control operations of devices included in the household (e.g., speakers, lights, doors, etc.). For example, the controller 312 may be configured to control operation of the network module 314 included in the control unit 310.

The network module 314 is a communication device configured to exchange communications over the network 305. The network module 314 may be a wireless communication module configured to exchange wireless communications over the network 305. For example, the network module 314 may be a wireless communication device configured to exchange communications over a wireless data channel and a wireless voice channel. In this example, the network module 314 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 314 also may be a wired communication module configured to exchange communications over the network 305 using a wired connection. For instance, the network module 314 may be a modem, a network interface card, or another type of network interface device. The network module 314 may be an Ethernet network card configured to enable the control unit 310 to communicate over a local area network and/or the Internet. The network module 314 also may be a voice band modem configured to enable the alarm panel to communicate over the telephone lines of Plain Old Telephone Systems (POTS).

The control unit system that includes the control unit 310 includes one or more sensors. For example, the monitoring system may include multiple sensors 320. The sensors 320 may include a lock sensor, a contact sensor, a motion sensor, or any other type of sensor included in a control unit system. The sensors 320 also may include an environmental sensor, such as a temperature sensor, a water sensor, a rain sensor, a wind sensor, a light sensor, a smoke detector, a carbon monoxide detector, an air quality sensor, etc. The sensors 320 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health-monitoring sensor can be a wearable sensor that attaches to a user in the home. The health-monitoring sensor can collect various health data, including pulse, heart rate, respiration rate, sugar or glucose level, bodily temperature, or motion data.

The sensors 320 can also include a radio-frequency identification (RFID) sensor that identifies a particular article that includes a pre-assigned RFID tag.

The control unit 310 communicates with the home automation controls 322 and a camera 330 to perform monitoring. The home automation controls 322 are connected to one or more devices that enable automation of actions in the home. For instance, the home automation controls 322 may be connected to one or more lighting systems and may be configured to control operation of the one or more lighting systems. In addition, the home automation controls 322 may be connected to one or more electronic locks at the home and may be configured to control operation of the one or more electronic locks (e.g., control Z-Wave locks using wireless communications in the Z-Wave protocol). Further, the home automation controls 322 may be connected to one or more appliances at the home and may be configured to control operation of the one or more appliances. The home automation controls 322 may include multiple modules that are each specific to the type of device being controlled in an automated manner. The home automation controls 322 may control the one or more devices based on commands received from the control unit 310. For instance, the home automation controls 322 may cause a lighting system to illuminate an area to provide a better image of the area when captured by a camera 330.

The camera 330 may be a video/photographic camera or other type of optical sensing device configured to capture images. For instance, the camera 330 may be configured to capture images of an area within a building or home monitored by the control unit 310. The camera 330 may be configured to capture single, static images of the area and also video images of the area in which multiple images of the area are captured at a relatively high frequency (e.g., thirty images per second). The camera 330 may be controlled based on commands received from the control unit 310.

The camera 330 may be triggered by several different types of techniques. For instance, a Passive Infra-Red (PIR) motion sensor may be built into the camera 330 and used to trigger the camera 330 to capture one or more images when motion is detected. The camera 330 also may include a microwave motion sensor built into the camera and used to trigger the camera 330 to capture one or more images when motion is detected. The camera 330 may have a "normally open" or "normally closed" digital input that can trigger capture of one or more images when external sensors (e.g., the sensors 320, PIR, door/window, etc.) detect motion or other events. In some implementations, the camera 330 receives a command to capture an image when external devices detect motion or another potential alarm event. The camera 330 may receive the command from the controller 312 or directly from one of the sensors 320.

In some examples, the camera 330 triggers integrated or external illuminators (e.g., Infra-Red, Z-wave controlled "white" lights, lights controlled by the home automation controls 322, etc.) to improve image quality when the scene is dark. An integrated or separate light sensor may be used to determine if illumination is desired and may result in increased image quality.

The camera 330 may be programmed with any combination of time/day schedules, system "arming state," or other variables to determine whether images should be captured or not when triggers occur. The camera 330 may enter a low-power mode when not capturing images. In this case, the camera 330 may wake periodically to check for inbound messages from the controller 312. The camera 330 may be powered by internal, replaceable batteries if located remotely from the control unit 310. The camera 330 may employ a small solar cell to recharge the battery when light is available. Alternatively, the camera 330 may be powered by the controller's 312 power supply if the camera 330 is co-located with the controller 312.

In some implementations, the camera 330 communicates directly with the monitoring server 360 over the Internet. In these implementations, image data captured by the camera 330 does not pass through the control unit 310 and the camera 330 receives commands related to operation from the monitoring server 360.

The system 300 also includes thermostat 334 to perform dynamic environmental control at the home. The thermostat 334 is configured to monitor temperature and/or energy consumption of an HVAC system associated with the thermostat 334, and is further configured to provide control of environmental (e.g., temperature) settings. In some implementations, the thermostat 334 can additionally or alternatively receive data relating to activity at a home and/or environmental data at a home, e.g., at various locations indoors and outdoors at the home. The thermostat 334 can directly measure energy consumption of the HVAC system associated with the thermostat, or can estimate energy consumption of the HVAC system associated with the thermostat 334, for example, based on detected usage of one or more components of the HVAC system associated with the thermostat 334. The thermostat 334 can communicate temperature and/or energy monitoring information to or from the control unit 310 and can control the environmental (e.g., temperature) settings based on commands received from the control unit 310.

In some implementations, the thermostat 334 is a dynamically programmable thermostat and can be integrated with the control unit 310. For example, the dynamically programmable thermostat 334 can include the control unit 310, e.g., as an internal component to the dynamically programmable thermostat 334. In addition, the control unit 310 can be a gateway device that communicates with the dynamically programmable thermostat 334. In some implementations, the thermostat 334 is controlled via one or more home automation controls 322.

A module 337 is connected to one or more components of an HVAC system associated with a home, and is configured to control operation of the one or more components of the HVAC system. In some implementations, the module 337 is also configured to monitor energy consumption of the HVAC system components, for example, by directly measuring the energy consumption of the HVAC system components or by estimating the energy usage of the one or more HVAC system components based on detecting usage of components of the HVAC system. The module 337 can communicate energy monitoring information and the state of the HVAC system components to the thermostat 334 and can control the one or more components of the HVAC system based on commands received from the thermostat 334.

In some examples, the system 300 further includes one or more robotic devices 390. The robotic devices 390 may be any type of robots that are capable of moving and taking actions that assist in home monitoring. For example, the robotic devices 390 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and roll along the ground, walls, or ceiling) and land vehicle type devices (e.g., automated cars that drive around a home). In some cases, the robotic devices 390 may be devices that are intended for other purposes and merely associated with the system 300 for use in appropriate circumstances. For instance, a robotic vacuum cleaner device may be associated with the monitoring system 300 as one of the robotic devices 390 and may be controlled to take action responsive to monitoring system events.

In some examples, the robotic devices 390 automatically navigate within a home. In these examples, the robotic devices 390 include sensors and control processors that guide movement of the robotic devices 390 within the home. For instance, the robotic devices 390 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 390 may include control processors that process output from the various sensors and control the robotic devices 390 to move along a path that reaches the desired destination and avoids obstacles. In this regard, the control processors detect walls or other obstacles in the home and guide movement of the robotic devices 390 in a manner that avoids the walls and other obstacles.

In addition, the robotic devices 390 may store data that describes attributes of the home. For instance, the robotic devices 390 may store a floorplan and/or a three-dimensional model of the home that enables the robotic devices 390 to navigate the home. During initial configuration, the robotic devices 390 may receive the data describing attributes of the home, determine a frame of reference to the data (e.g., a home or reference location in the home), and navigate the home based on the frame of reference and the data describing attributes of the home. Further, initial configuration of the robotic devices 390 also may include learning of one or more navigation patterns in which a user provides input to control the robotic devices 390 to perform a specific navigation action (e.g., fly to an upstairs bedroom and spin around while capturing video and then return to a home charging base). In this regard, the robotic devices 390 may learn and store the navigation patterns such that the robotic devices 390 may automatically repeat the specific navigation actions upon a later request.

In some examples, the robotic devices 390 may include data capture and recording devices. In these examples, the robotic devices 390 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 390 to take and store a biometric sample that can be used to identify the person (e.g., a biometric sample with DNA that can be used for DNA testing).

In some implementations, the robotic devices 390 may include output devices. In these implementations, the robotic devices 390 may include one or more displays, one or more speakers, and/or any type of output devices that allow the robotic devices 390 to communicate information to a nearby user.

The robotic devices 390 also may include a communication module that enables the robotic devices 390 to communicate with the control unit 310, each other, and/or other devices. The communication module may be a wireless communication module that allows the robotic devices 390 to communicate wirelessly. For instance, the communication module may be a Wi-Fi module that enables the robotic devices 390 to communicate over a local wireless network at the home. The communication module further may be a 900 MHz wireless communication module that enables the robotic devices 390 to communicate directly with the control unit 310. Other types of short-range wireless communication protocols, such as Bluetooth, Bluetooth LE, Z-wave, Zigbee, etc., may be used to allow the robotic devices 390 to communicate with other devices in the home. In some implementations, the robotic devices 390 may communicate with each other or with other devices of the system 300 through the network 305.

The robotic devices 390 further may include processor and storage capabilities. The robotic devices 390 may include any suitable processing devices that enable the robotic devices 390 to operate applications and perform the actions described throughout this disclosure. In addition, the robotic devices 390 may include solid-state electronic storage that enables the robotic devices 390 to store applications, configuration data, collected sensor data, and/or any other type of information available to the robotic devices 390.

The robotic devices 390 are associated with one or more charging stations. The charging stations may be located at predefined home base or reference locations in the home. The robotic devices 390 may be configured to navigate to the charging stations after completion of tasks needed to be performed for the monitoring system 300. For instance, after completion of a monitoring operation or upon instruction by the control unit 310, the robotic devices 390 may be configured to automatically fly to and land on one of the charging stations. In this regard, the robotic devices 390 may automatically maintain a fully charged battery in a state in which the robotic devices 390 are ready for use by the monitoring system 300.

The charging stations may be contact based charging stations and/or wireless charging stations. For contact based charging stations, the robotic devices 390 may have readily accessible points of contact that the robotic devices 390 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 390 may charge through a wireless exchange of power. In these cases, the robotic devices 390 need only locate themselves closely enough to the wireless charging stations for the wireless exchange of power to occur. In this regard, the positioning needed to land at a predefined home base or reference location in the home may be less precise than with a contact based charging station. Based on the robotic devices 390 landing at a wireless charging station, the wireless charging station outputs a wireless signal that the robotic devices 390 receive and convert to a power signal that charges a battery maintained on the robotic devices 390.

In some implementations, each of the robotic devices 390 has a corresponding and assigned charging station such that the number of robotic devices 390 equals the number of charging stations. In these implementations, the robotic devices 390 always navigate to the specific charging station assigned to that robotic device. For instance, a first robotic device may always use a first charging station and a second robotic device may always use a second charging station.

In some examples, the robotic devices 390 may share charging stations. For instance, the robotic devices 390 may use one or more community charging stations that are capable of charging multiple robotic devices 390. The community charging station may be configured to charge multiple robotic devices 390 in parallel. The community charging station may be configured to charge multiple robotic devices 390 in serial such that the multiple robotic devices 390 take turns charging and, when fully charged, return to a predefined home base or reference location in the home that is not associated with a charger. The number of community charging stations may be less than the number of robotic devices 390.

In addition, the charging stations may not be assigned to specific robotic devices 390 and may be capable of charging any of the robotic devices 390. In this regard, the robotic devices 390 may use any suitable, unoccupied charging station when not in use. For instance, when one of the robotic devices 390 has completed an operation or is in need of battery charge, the control unit 310 references a stored table of the occupancy status of each charging station and instructs the robotic device to navigate to the nearest charging station that is unoccupied.

The system 300 further includes one or more integrated security devices 380. The one or more integrated security devices may include any type of device used to provide alerts based on received sensor data. For instance, the one or more control units 310 may provide one or more alerts to the one or more integrated security input/output devices 380. Additionally, the one or more control units 310 may receive one or more sensor data from the sensors 320 and determine whether to provide an alert to the one or more integrated security input/output devices 380.

The sensors 320, the home automation controls 322, the camera 330, the thermostat 334, and the integrated security devices 380 may communicate with the controller 312 over communication links 324, 326, 328, 332, 338, and 384. The communication links 324, 326, 328, 332, 338, and 384 may be a wired or wireless data pathway configured to transmit signals from the sensors 320, the home automation controls 322, the camera 330, the thermostat 334, and the integrated security devices 380 to the controller 312. The sensors 320, the home automation controls 322, the camera 330, the thermostat 334, and the integrated security devices 380 may continuously transmit sensed values to the controller 312, periodically transmit sensed values to the controller 312, or transmit sensed values to the controller 312 in response to a change in a sensed value.

The communication links 324, 326, 328, 332, 338, and 384 may include a local network. The sensors 320, the home automation controls 322, the camera 330, the thermostat 334, and the integrated security devices 380, and the controller 312 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 360 is an electronic device configured to provide monitoring services by exchanging electronic communications with the control unit 310, the one or more user devices 340 and 350, and the central alarm station server 370 over the network 305. For example, the monitoring server 360 may be configured to monitor events generated by the control unit 310. In this example, the monitoring server 360 may exchange electronic communications with the network module 314 included in the control unit 310 to receive information regarding events detected by the control unit 310. The monitoring server 360 also may receive information regarding events from the one or more user devices 340 and 350.

In some examples, the monitoring server 360 may route alert data received from the network module 314 or the one or more user devices 340 and 350 to the central alarm station server 370. For example, the monitoring server 360 may transmit the alert data to the central alarm station server 370 over the network 305.

The monitoring server 360 may store sensor and image data received from the monitoring system and perform analysis of sensor and image data received from the monitoring system. Based on the analysis, the monitoring server 360 may communicate with and control aspects of the control unit 310 or the one or more user devices 340 and 350.

The monitoring server 360 may provide various monitoring services to the system 300. For example, the monitoring server 360 may analyze the sensor, image, and other data to determine an activity pattern of a resident of the home monitored by the system 300. In some implementations, the monitoring server 360 may analyze the data for alarm conditions or may determine and perform actions at the home by issuing commands to one or more of the controls 322, possibly through the control unit 310.

The monitoring server 360 can be configured to provide information (e.g., activity patterns) related to one or more residents of the home monitored by the system 300 (e.g., user 105). For example, one or more of the sensors 320, the home automation controls 322, the camera 330, the thermostat 334, and the integrated security devices 380 can collect data related to a resident including location information (e.g., if the resident is home or is not home) and provide location information to the thermostat 334.

The central alarm station server 370 is an electronic device configured to provide alarm monitoring service by exchanging communications with the control unit 310, the one or more user devices 340 and 350, and the monitoring server 360 over the network 305. For example, the central alarm station server 370 may be configured to monitor alerting events generated by the control unit 310. In this example, the central alarm station server 370 may exchange communications with the network module 314 included in the control unit 310 to receive information regarding alerting events detected by the control unit 310. The central alarm station server 370 also may receive information regarding alerting events from the one or more user devices 340 and 350 and/or the monitoring server 360.

The central alarm station server 370 is connected to multiple terminals 372 and 374. The terminals 372 and 374 may be used by operators to process alerting events. For example, the central alarm station server 370 may route alerting data to the terminals 372 and 374 to enable an operator to process the alerting data. The terminals 372 and 374 may include general-purpose computers (e.g., desktop personal computers, workstations, or laptop computers) that are configured to receive alerting data from a server in the central alarm station server 370 and render a display of information based on the alerting data. For instance, the controller 312 may control the network module 314 to transmit, to the central alarm station server 370, alerting data indicating that a sensor 320 detected motion from a motion sensor via the sensors 320. The central alarm station server 370 may receive the alerting data and route the alerting data to the terminal 372 for processing by an operator associated with the terminal 372. The terminal 372 may render a display to the operator that includes information associated with the alerting event (e.g., the lock sensor data, the motion sensor data, the contact sensor data, etc.) and the operator may handle the alerting event based on the displayed information.

In some implementations, the terminals 372 and 374 may be mobile devices or devices designed for a specific function. Although FIG. 3 illustrates two terminals for brevity, actual implementations may include more (and, perhaps, many more) terminals.

The one or more authorized user devices 340 and 350 are devices that host and display user interfaces. For instance, the user device 340 is a mobile device that hosts or runs one or more native applications (e.g., the home monitoring application 342). The user device 340 may be a cellular phone or a non-cellular locally networked device with a display. The user device 340 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 340 may perform functions unrelated to the monitoring system, such as placing personal telephone calls, playing music, playing video, displaying pictures, browsing the Internet, maintaining an electronic calendar, etc.

The user device 340 includes a home monitoring application 352. The home monitoring application 342 refers to a software/firmware program running on the corresponding mobile device that enables the user interface and features described throughout. The user device 340 may load or install the home monitoring application 342 based on data received over a network or data received from local media. The home monitoring application 342 runs on mobile devices platforms, such as iPhone, iPod touch, Blackberry, Google Android, Windows Mobile, etc. The home monitoring application 342 enables the user device 340 to receive and process image and sensor data from the monitoring system.

The user device 340 may be a general-purpose computer (e.g., a desktop personal computer, a workstation, or a laptop computer) that is configured to communicate with the monitoring server 360 and/or the control unit 310 over the network 305. The user device 340 may be configured to display a smart home user interface 352 that is generated by the user device 340 or generated by the monitoring server 360. For example, the user device 340 may be configured to display a user interface (e.g., a web page) provided by the monitoring server 360 that enables a user to perceive images captured by the camera 330 and/or reports related to the monitoring system. Although FIG. 3 illustrates two user devices for brevity, actual implementations may include more (and, perhaps, many more) or fewer user devices.

In some implementations, the one or more user devices 340 and 350 communicate with and receive monitoring system data from the control unit 310 using the communication link 338. For instance, the one or more user devices 340 and 350 may communicate with the control unit 310 using various local wireless protocols such as Wi-Fi, Bluetooth, Z-wave, Zigbee, HomePlug (ethernet over power line), or wired protocols such as Ethernet and USB, to connect the one or more user devices 340 and 350 to local security and automation equipment. The one or more user devices 340 and 350 may connect locally to the monitoring system and its sensors and other devices. The local connection may improve the speed of status and control communications because communicating through the network 305 with a remote server (e.g., the monitoring server 360) may be significantly slower.

Although the one or more user devices 340 and 350 are shown as communicating with the control unit 310, the one or more user devices 340 and 350 may communicate directly with the sensors and other devices controlled by the control unit 310. In some implementations, the one or more user devices 340 and 350 replace the control unit 310 and perform the functions of the control unit 310 for local monitoring and long range/offsite communication.

In other implementations, the one or more user devices 340 and 350 receive monitoring system data captured by the control unit 310 through the network 305. The one or more user devices 340, 350 may receive the data from the control unit 310 through the network 305 or the monitoring server 360 may relay data received from the control unit 310 to the one or more user devices 340 and 350 through the network 305. In this regard, the monitoring server 360 may facilitate communication between the one or more user devices 340 and 350 and the monitoring system.

In some implementations, the one or more user devices 340 and 350 may be configured to switch whether the one or more user devices 340 and 350 communicate with the control unit 310 directly (e.g., through link 338) or through the monitoring server 360 (e.g., through network 305) based on a location of the one or more user devices 340 and 350. For instance, when the one or more user devices 340 and 350 are located close to the control unit 310 and in range to communicate directly with the control unit 310, the one or more user devices 340 and 350 use direct communication. When the one or more user devices 340 and 350 are located far from the control unit 310 and not in range to communicate directly with the control unit 310, the one or more user devices 340 and 350 use communication through the monitoring server 360.

Although the one or more user devices 340 and 350 are shown as being connected to the network 305, in some implementations, the one or more user devices 340 and 350 are not connected to the network 305. In these implementations, the one or more user devices 340 and 350 communicate directly with one or more of the monitoring system components and no network (e.g., Internet) connection or reliance on remote servers is needed.

In some implementations, the one or more user devices 340 and 350 are used in conjunction with only local sensors and/or local devices in a house. In these implementations, the system 300 includes the one or more user devices 340 and 350, the sensors 320, the home automation controls 322, the camera 330, and the robotic devices 390. The one or more user devices 340 and 350 receive data directly from the sensors 320, the home automation controls 322, the camera 330, and the robotic devices 390, and sends data directly to the sensors 320, the home automation controls 322, the camera 330, and the robotic devices 390. The one or more user devices 340, 350 provide the appropriate interfaces/processing to provide visual surveillance and reporting.

In other implementations, the system 300 further includes network 305 and the sensors 320, the home automation controls 322, the camera 330, the thermostat 334, and the robotic devices 390, and are configured to communicate sensor and image data to the one or more user devices 340 and 350 over network 305 (e.g., the Internet, cellular network, etc.). In yet another implementation, the sensors 320, the home automation controls 322, the camera 330, the thermostat 334, and the robotic devices 390 (or a component, such as a bridge/router) are intelligent enough to change the communication pathway from a direct local pathway when the one or more user devices 340 and 350 are in close physical proximity to the sensors 320, the home automation controls 322, the camera 330, the thermostat 334, and the robotic devices 390 to a pathway over network 305 when the one or more user devices 340 and 350 are farther from the sensors 320, the home automation controls 322, the camera 330, the thermostat 334, and the robotic devices 390.

In some examples, the system leverages GPS information from the one or more user devices 340 and 350 to determine whether the one or more user devices 340 and 350 are close enough to the sensors 320, the home automation controls 322, the camera 330, the thermostat 334, and the robotic devices 390 to use the direct local pathway or whether the one or more user devices 340 and 350 are far enough from the sensors 320, the home automation controls 322, the camera 330, the thermostat 334, and the robotic devices 390 that the pathway over network 305 is required.

In other examples, the system leverages status communications (e.g., pinging) between the one or more user devices 340 and 350 and the sensors 320, the home automation controls 322, the camera 330, the thermostat 334, and the robotic devices 390 to determine whether communication using the direct local pathway is possible. If communication using the direct local pathway is possible, the one or more user devices 340 and 350 communicate with the sensors 320, the home automation controls 322, the camera 330, the thermostat 334, and the robotic devices 390 using the direct local pathway. If communication using the direct local pathway is not possible, the one or more user devices 340 and 350 communicate with the sensors 320, the home automation controls 322, the camera 330, the thermostat 334, and the robotic devices 390 using the pathway over network 305.

In some implementations, the system 300 provides end users with access to images captured by the camera 330 to aid in decision making. The system 300 may transmit the images captured by the camera 330 over a wireless WAN network to the user devices 340 and 350. Because transmission over a wireless WAN network may be relatively expensive, the system 300 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 330). In these implementations, the camera 330 may be set to capture images on a periodic basis when the alarm system is armed in an "away" state, but set not to capture images when the alarm system is armed in a "home" state or disarmed. In addition, the camera 330 may be triggered to begin capturing images when the alarm system detects an event, such as an alarm event, a door-opening event for a door that leads to an area within a field of view of the camera 330, or motion in the area within the field of view of the camera 330. In other implementations, the camera 330 may capture images continuously, but the captured images may be stored or transmitted over a network when needed.

The system 300 further includes a tampering detector 395 in communication with the control unit 310 through a communication link 397, which similarly to as described above in regards to communication links 324, 326, 328, 332, 338, and 384, may be wired or wireless and include a local network. The tampering detector 395 may include the tampering risk calculator 118 and the tampering actions engine 122, the control unit 310 may be the monitoring system control panel 110, the sensors 320 may include the security cameras A and B 102, 104, and the monitoring server 360 may be the monitoring server 108.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A system comprising:
one or more processors and one or more computer storage media storing instructions that are operable, when executed by the one or more processors, to cause the one or more processors to perform operations comprising:
obtaining first video data representing first video images of a scene captured by a camera;
storing the first video data in a memory;
determining a likelihood that the camera will be tampered with based on the first video data;
determining that the likelihood that the camera will be tampered with satisfies criteria;
obtaining second video data representing second video images of the scene captured by the camera; and
in response to determining that the likelihood that the camera will be tampered with satisfies criteria, transmitting the second video data and a portion of the first video data, wherein frames of the portion of the first video data are transmitted interleaved with transmission of frames of the second video data.

2. The system of claim 1, wherein determining the likelihood that the camera will be tampered with based on the first video data comprises:
determining, using video analysis, that a person depicted within the scene is approaching the camera based on one or more of a speed of approach, a direction of approach, a distance from the camera, a movement of a limb, or an eye direction of the person.

3. The system of claim 1, wherein determining the likelihood that the camera will be tampered with based on the first video data comprises determining, using video analysis, that a person depicted within the scene is an unrecognized person.

4. The system of claim 3 wherein determining that the person depicted within the scene is an unrecognized person comprises determining that at least part of the person's face is concealed.

5. The system of claim 1, the operations comprising:
in response to determining that the likelihood that the camera will be tampered with satisfies a criteria, estimating, using video analysis, a time that camera tampering will likely occur.

6. The system of claim 5, the operations comprising:
determining, based on the estimated time that the camera will be tampered with, a size of data that is capable of transmission before the estimated time that the camera will be tampered with; and
based on determining the size of data that is capable of transmission before the estimated time that the camera will be tampered with, selecting a subset of the first video data to transmit, the subset of the first video data having a size that is less than the size of data that is capable of transmission before the estimated time.

7. The system of claim 1, wherein determining that the likelihood that the camera will be tampered with satisfies criteria comprises:
determining a risk score of camera tampering;
determining that the risk score exceeds a threshold risk score; and
based on determining that the risk score exceeds the threshold risk score, determining that the likelihood that the camera will be tampered with satisfies the criteria.

8. The system of claim 1, wherein transmitting the second video data comprises transmitting, to a server and from the system, a notification of likely camera tampering.

9. The system of claim 1, wherein transmitting the second video data comprises transmitting, in real-time, the second video data.

10. The system of claim 1, the operations comprising:
determining (i) that the camera was not tampered with or (ii) that the likelihood that the camera will be tampered with no longer satisfies criteria; and
in response to determining (i) that the camera was not tampered with or (ii) that the likelihood that the camera will be tampered with no longer satisfies the criteria:
transmitting a notification that (i) that the camera was not tampered with or (ii) that the likelihood that the camera will be tampered with no longer satisfies the criteria; and
transmitting the first video data that was stored in the memory.

11. The system of claim 1, the operations comprising:
receiving system data indicating a status of one or more system components; and determining the likelihood that the camera will be tampered with based on the first video data and based on the status of the one or more system components.

12. The system of claim 11, wherein the status of the one or more system components comprises an arming status of a monitoring system that is configured to monitor a location of the scene.

13. The system of claim 11, wherein:
the status of the one or more system components comprises a status of one or more additional cameras, and
determining the likelihood that the camera will be tampered with based on the first video data and based on the status of the one or more system components comprises:
    determining, based on the status of the one or more additional cameras, that the one or more additional cameras was tampered with; and
    based on determining that the one or more additional cameras was tampered with, determining the likelihood that the camera will be tampered with.

14. The system of claim 1, the operations comprising:
in response to transmitting the second video data, receiving a confirmation that the camera was tampered with; and
in response to receiving the confirmation that the camera was tampered with, performing a system action.

15. The system of claim 1, wherein transmitting the second video data comprises:
transmitting, at a first video quality, the second video data; and
storing the second video data in the memory at a second video quality, wherein the first video quality is a lower video quality than the second video quality.

16. The system of claim 15, comprising:
transmitting the first video data after transmitting the second video data at the first video quality; and
transmitting the second video data at the second video quality from the memory after transmitting the first video data.

17. The system of claim 1, comprising:
cropping, from the first video data, an image of a person depicted within the scene; and
transmitting the cropped image of the person depicted within the scene.

18. A method, comprising:
obtaining first video data representing first video images of a scene captured by a camera;
storing the first video data in a memory;
determining a likelihood that the camera will be tampered with based on the first video data;
determining that the likelihood that the camera will be tampered with satisfies criteria;
obtaining second video data representing second video images of the scene captured by the camera; and
in response to determining that the likelihood that the camera will be tampered with satisfies criteria, transmitting the second video data and a portion of the first video data, wherein frames of the portion of the first video data are transmitted interleaved with transmission of frames of the second video data.

19. A non-transitory computer-readable medium storing software comprising instructions executable by one or more computers which, upon such execution, cause the one or more computers to perform operations comprising:
obtaining first video data representing first video images of a scene captured by a camera;
storing the first video data in a memory;
determining a likelihood that the camera will be tampered with based on the first video data;
determining that the likelihood that the camera will be tampered with satisfies criteria;
obtaining second video data representing second video images of the scene captured by the camera; and
in response to determining that the likelihood that the camera will be tampered with satisfies criteria, transmitting the second video data and a portion of the first video data, wherein frames of the portion of the first video data are transmitted interleaved with transmission of frames of the second video data.

* * * * *